United States Patent [19]

Kittag

[11] 4,202,610
[45] May 13, 1980

[54] MOTION PICTURE CAMERA WITH FADE-IN AND FADE-OUT EFFECTS DURING LONG-TERM EXPOSURE

[75] Inventor: Gerd Kittag, Vienna, Austria

[73] Assignees: Karl Vockenhuber; Raimund Hauser, both of Vienna, Austria

[21] Appl. No.: 943,988

[22] Filed: Sep. 20, 1978

[30] Foreign Application Priority Data

Sep. 22, 1977 [CH] Switzerland .................. 11588/77

[51] Int. Cl.² .................. G03B 9/58; G03B 19/18
[52] U.S. Cl. .................. 352/91 C; 352/180
[58] Field of Search .................. 352/169, 180, 91 C, 352/91 S

[56] References Cited
U.S. PATENT DOCUMENTS

| | | | |
|---|---|---|---|
| 4,003,646 | 1/1977 | Freudenschuss et al. | 352/180 |
| 4,006,975 | 2/1977 | Wagensonner et al. | 352/91 C |
| 4,106,864 | 8/1978 | Burgermann | 352/91 C |
| 4,106,865 | 8/1978 | Burgermann | 352/91 C |

Primary Examiner—Russell E. Adams
Attorney, Agent, or Firm—Montague & Ross

[57] ABSTRACT

A motion-picture camera switchable to long-term exposure, in the presence of insufficient illumination for normal filming, has a photodetector which in the long-term mode controls a timing circuit measuring the length of an exposure period during which the camera shutter is arrested in an unblocking position, that period varying inversely with the detected intensity of incident light. In order to provide a fade-out effect at the end of a scene taken in this manner, the exposure period is progressively shortened—or the diaphragm aperture is progressively reduced—in discrete steps during successive shutter cycles to substantially complete cutoff. For fade-in at the beginning of a scene filmed with long-term exposure, the opposite procedure is followed.

14 Claims, 6 Drawing Figures

MOTION PICTURE CAMERA WITH FADE-IN AND FADE-OUT EFFECTS DURING LONG-TERM EXPOSURE

My present invention relates to a motion-picture camera that is selectively switchable between a normal mode of operation, in which a preferably rotatable shutter unblocks an image gate to illuminate a film frame during consecutive cycles of invariable length (e.g. at a rate of 18 cycles or frames per second), and a mode of long-term exposure in which the shutter and the film transport are arrested for a variable length of time, usually under the control of a photometer, when the incident light is insufficient for normal exposure.

BACKGROUND OF THE INVENTION

A camera of this type has been described in commonly owned U.S. Pat. No. 4,003,646 which also discloses means for automatically switching to the long-term mode upon sensing the lack of sufficient illumination even in the wide-open position of an associated diaphragm. In a commonly owned copending application, Ser. No. 906,862 filed May 17, 1978, I have disclosed a similar system in which, however, only the film transport is arrested for long-term exposure while the shutter continues operating at its normal rate.

In a motion-picture camera wherein the aperture of a diaphragm is controlled automatically, e.g. with the aid of a bridge circuit including a photosensor in one of its branches, fade-in and fade-out operations can be initiated by modifying the circuitry of a photometer to simulate a more intense illumination, thus causing a reduction in the diaphragm aperture. Such an aperture reduction, when coming at the end of a scene, produces a fade-out effect; for a fade-in effect at the beginning of a scene, closure of the diaphragm to an extent unrelated to the actual lighting conditions precedes the start of the picture-taking process and is then followed by a progressive reopening of the diaphragm to the degree required by the actual luminous intensity. The fade-in or fade-out time depends on the speed of the diaphragm-setting motor and may last about 36 frames or two seconds, for example.

With a camera operating in the long-term mode, fading can no longer be carried out in this manner since a reduction in diaphragm aperture—and therefore in available illumination—would automatically extend the unblocking phase of a shutter cycle and would therefore delay or possibly prevent the advance of the film to its next frame.

OBJECT OF THE INVENTION

The object of my present invention, therefore, is to provide means in such a camera for facilitating fade-in and fade-out operations also during long-term exposure.

SUMMARY OF THE INVENTION

A camera embodying my invention, switchable (manually or automatically) between a normal mode and a long-term mode as discussed above, includes a timer that in the long-term mode measures the length of an exposure period during which the shutter drive and the film transport are arrested, the duration of this exposure period varying generally inversely with the intensity of illumination traversing the unblocked image gate. The timer, for this purpose, integrates an electrical variable (usually a current) appearing in the output of an associated photometer to produce a criterion for the termination of a shutter cycle, i.e. for a resumption of the advance of the film. The parameters contributing to this criterion are, therefore, the intensity of illumination on the one hand and the impedances of the photometric and/or timing circuitry by which the output voltage or current of the photosensor is compared with a threshold or reference value.

In accordance with my present invention, I provide fading-control means adapted to be operatively coupled with the timing means for changing the exposure of successive frames between a predetermined maximum value and substantially zero or some other predetermined minimum value, the fading-control means comprising a signal generator which can be actuated to produce a preferably stepped control signal for progressively modifying at least one of the aforementioned contributing parameters by discrete increments during successive shutter cycles.

If the parameter to be modified is the intensity of incident light as controlled by an adjustable diaphragm in line with the picture-taking objective, the output of the signal generator is connected to the aperture-adjusting means of that diaphragm. Such an arrangement, however, cannot be used where the timer controlling the exposure interval during long-term operation includes a photosensor illuminated through an ancillary diaphragm coupled with the main diaphragm, as described in the aforementioned U.S. Pat. No. 4,003,646. Alternatively, therefore, the signal generator may directly control the timing means, as by selectively charging or discharging a biasing capacitor of a threshold circuit forming part thereof. The signal generator could also modify the operation of the photometric circuit by being connected to an input of a voltage comparator included in that circuit.

Various types of signal generators can be used for this purpose. More specifically, I may employ a reversible pulse counter which can be stepped forward for a fade-out operation by the output of the threshold circuit or of any other source generating one pulse per cycle, such as a photosensor in a light path downstream of the shutter, and can be stepped backward in like manner for a fade-in operation. The signal could also be a mechanical device such as a program disk adapted to be coupled with the shutter drive for entrainment thereby.

A particularly advantageous embodiment of my invention includes mutually independent selection and switchover means respectively serving for the initiation of a fading operation, by simulating a more intense illumination as described above, and for decoupling the diaphragm-adjusting means from the photometer to change from normal operation to the long-term mode. The signal generator, in this case, is actuatable by the selector means in an off-normal or long-term position of the switchover means to emit a control signal varying monotonically in one sense (e.g. increasing) if the triggering of the shutter and film drive precedes the selection of fading, and in the opposite sense (e.g. decreasing) if the sequence of these operations is reversed.

BRIEF DESCRIPTION OF THE DRAWING

The above and other features of my invention will now be described in detail with reference to the accompanying drawing in which.

SPECIFIC DESCRIPTION

Figure 1:
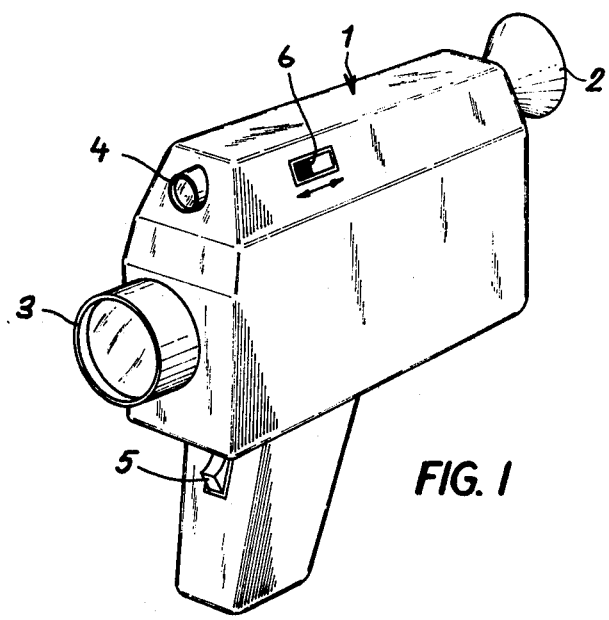
FIG. 1 is a perspective view of a motion-picture camera embodying my invention.

In FIG. 1 I have shown the exterior of a hand-held cinematographic camera comprising a housing 1 provided with an eyecup 2 for the observation of a viewfinder, a picture-taking objective 3, and an ancillary objective 4 which forms part of the viewfinder and also serves for the illumination of a photosensor in an exposure-timing circuit as more fully described hereinafter. A trigger switch 5 on a handgrip of the camera housing is depressed for filming. A selector switch 6 serves to provide a fading effect both during normal operation and upon a switchover to long-term exposure under the control of a mode-selector switch not shown in FIG. 1.

Figure 2:
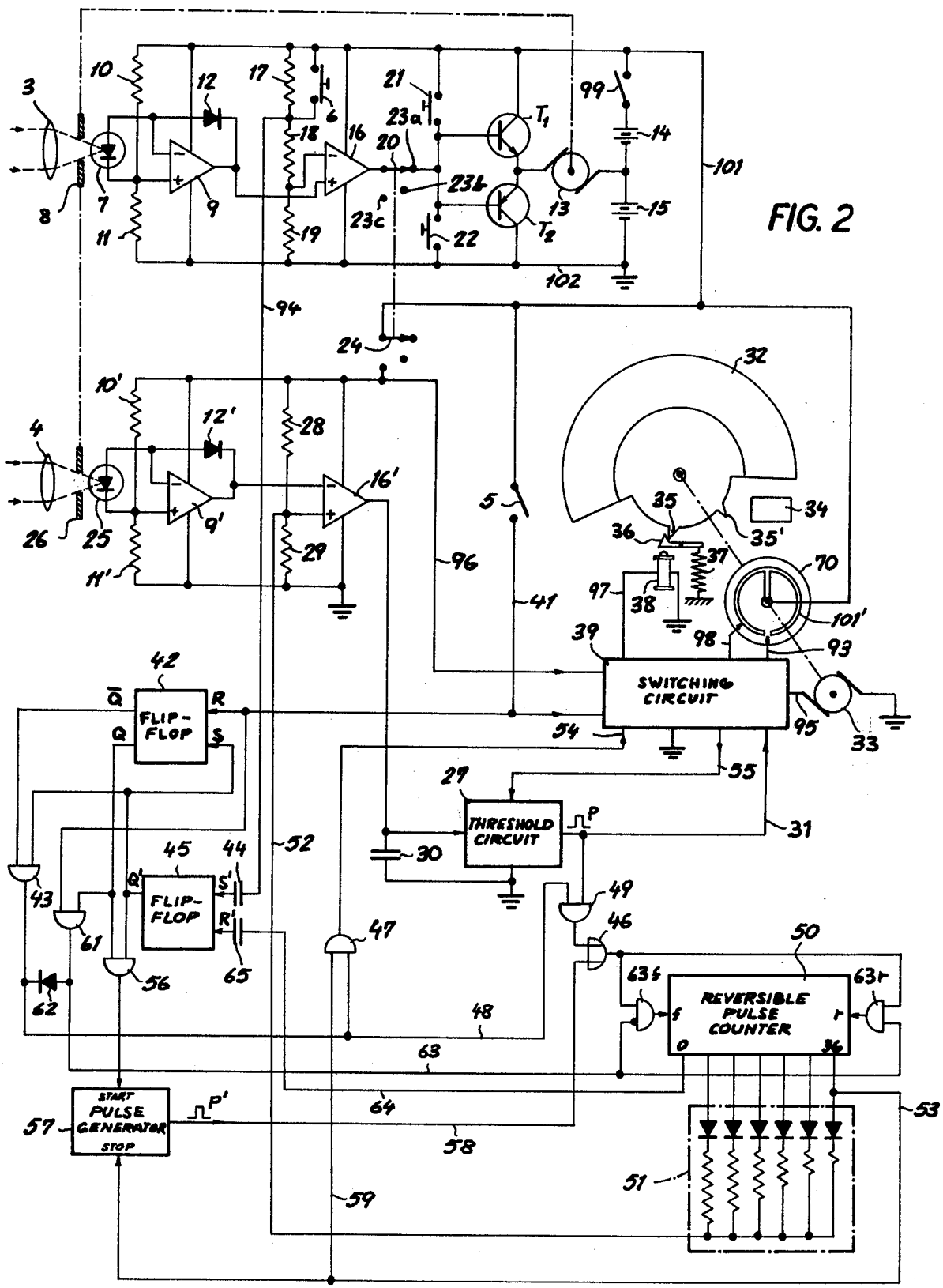
FIG. 2 is a circuit diagram of a control system for optionally operating the camera of FIG. 1 with long-term exposure and/or fading effect.
Figure 4:
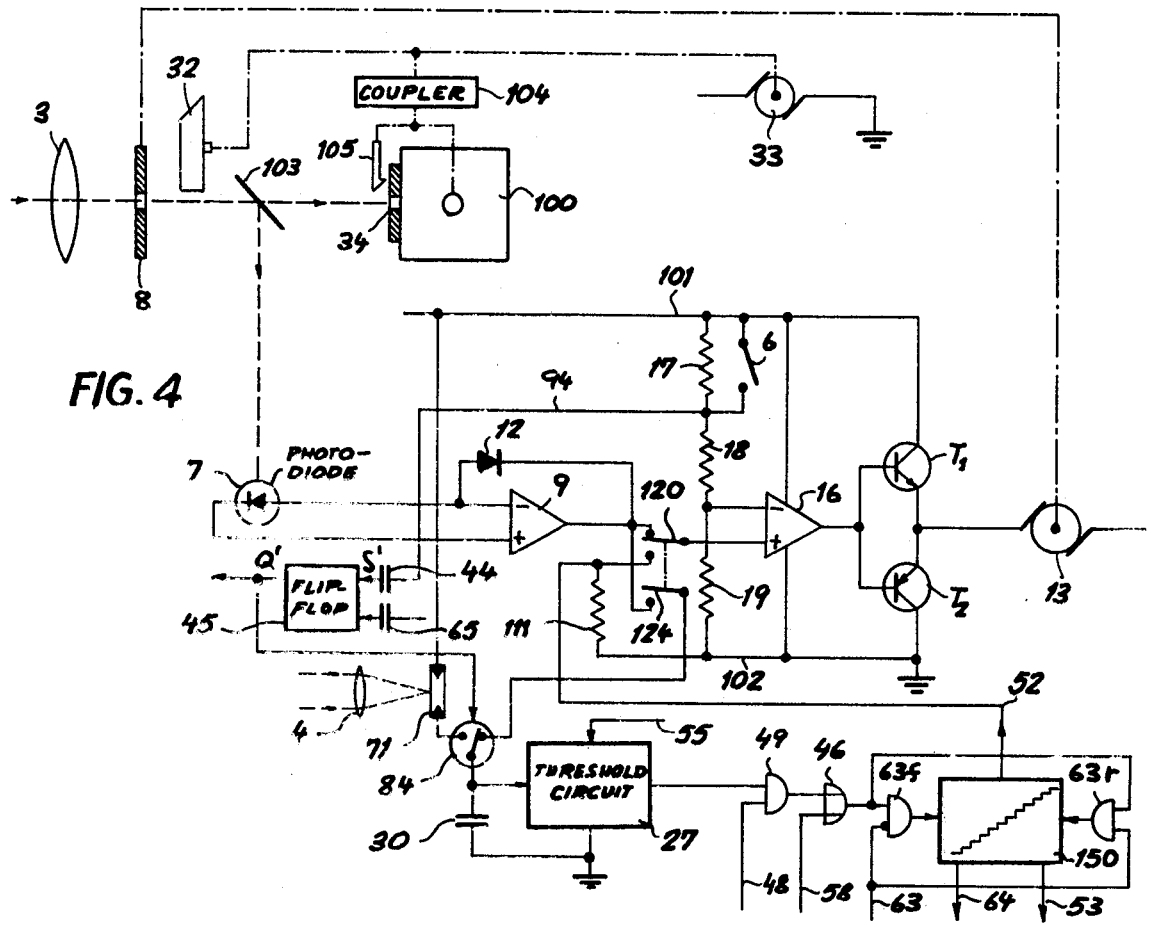

FIG. 2 shows the main objective 3 in line with an adjustable iris diaphragm 8 through which incident light is directed, on the one hand, upon an image gate 34 past a rotary shutter 32 and on the other hand upon a photodiode 7, preferably of silicon. In this schematic view the shutter 32 and the image gate 34 are not shown located in the path of the incident light; in the actual camera, however, light gate 34 is in line with objective 3 and diaphragm 8 as well as with a semireflecting mirror (or reflex prism) 103 directing some of that light toward the photodiode 7, as shown in FIG. 4. This latter Figure also depicts a film cassette 100 and a reciprocating claw 105, forming part of a conventional film-transport mechanism not further illustrated, which is driven through a coupler 104 by an electric motor 33 also rotating the shutter 32 at a constant speed during normal operation. Another motor 13 serves for the adjustment of the diaphragm aperture as schematically indicated in both FIGS. 2 and 4.

A power supply comprises a pair of batteries 14 and 15, which could be accommodated in the handgrip of the camera 1 (FIG. 1), connected between a high-voltage bus 101 and a ground bus 102 in series with a main switch 99. An operational amplifier 9 has an inverting input (−) and a noninverting input (+) connected across photodiode 7, its noninverting input being also tied to the junction of two series resistors 10 and 11 forming a voltage divider between lines 101 and 102. The feedback circuit of amplifier 9, extending between its output and its inverting input, includes a diode 12 designed to impart to it a logarithmic characteristic. Another operational amplifier 16, designed as a voltage comparator, has its noninverting input connected to the output of amplifier 9 and has its inverting input tied to the junction of two series resistors 18 and 19 forming with a third resistor 17 another voltage divider in parallel with divider 10, 11. Resistor 17 is selectively short-circuitable by the manual switch 6 serving to initiate a fading effect.

Another manual switch 20, constituting the aforementioned mode selector, connects the output of amplifier 16 to any one of three bank contacts 23a, 23b, 23c and is ganged with a similar switch 24. In the illustrated position of selector switch 20, amplifier 16 works via bank contact 23a into the bases of two complementary transistors $T_1$, $T_2$ serially connected between lines 101 and 102. Motor 13 is inserted between the junction of the emitters of transistors $T_1$, $T_2$ and the common terminal of batteries 14, 15.

With switch 20 on its intermediate contact 23b, two other switches 21 and 22 are manually operable to connect the bases of these transistors to positive potential on line 101 or to ground on line 102 for rendering transistor $T_1$ or $T_2$ conductive to energize the motor 13 in a diaphragm-opening or a diaphragm-closing sense, respectively, independently of sensing circuit 7, 9, 16.

In the illustrated position of switch 20, the camera operates in the normal mode with automatic adjustment of diaphragm 8 according to the intensity of the incident light as measured by photodiode 7. When that intensity increases, the inverting input of amplifier 9 goes more positive so that the noninverting input of amplifier 16 is driven negative and turns on the transistor $T_2$; motor 13 then reduces the diaphragm aperture. Conversely, a decrease in illumination turns on the transistor $T_1$ whereby motor 13 increases that aperture if the diaphragm is not yet in its wide-open position.

Figure 5:
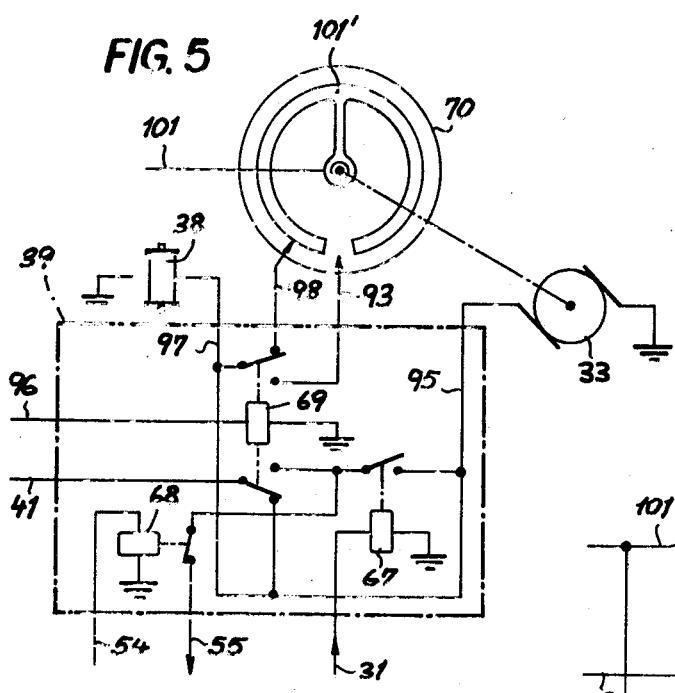
FIG. 5 is a diagram of a switching circuit included in the control system of FIGS. 2–4.

Closure of switch 6 with this normal mode of operation drives the inverting input of amplifier 16 sharply positive so that transistor $T_2$ conducts as though the intensity of incident light rays had suddenly increased, with the result that motor 13 reduces the aperture of diaphragm 8 to near or complete cutoff; this provides the desired fade-out effect if the camera is running, i.e. if trigger switch 5 has been closed to energize the motor 33 by way of a circuit 39 more fully described hereinafter with reference to FIG. 5. If closure of switch 5 precedes the closure of switch 6, the next picture-taking sequence will start with the diaphragm 8 substantially closed and opening gradually upon the restoration of switch 6 to normal; at the end of this fade-in operation, motor 13 is stopped in a position corresponding to the actual illumination as determined by the sensing circuit.

Another photodiode 25 is shown positioned for illumination through ancillary objective 4 by way of a diaphragm 26 which is coupled with diaphragm 8 for simultaneous adjustment. Here again, a semireflecting mirror or reflex prism may be used to direct part of the incident light onto the photodiode while letting the remainder pass through the viewfinder toward eyecup 2 of FIG. 1. Photodiode 25 is connected across the inputs of an operational amplifier 9' which, similarly to amplifier 9, is provided with a feedback diode 12' and has its noninverting input tied to the junction of two resistors 10', 11' connected between ground and an ancillary bus 96 which is energized from line 101 by way of switch 24 when switch 20 stands on its bank contact 23c. Another operational amplifier 16' has its inverting input connected to the output of amplifier 9' and has its noninverting input tied to the junction of two series resistors 28 and 29 constituting a further voltage divider in parallel with divider 10', 11'.

Amplifier 16' works into a storage capacitor 30 lying in the input of a threshold circuit 27 which compares the capacitor charge with an internally generated reference potential to emit a stepping pulse P on a lead 31 when that potential is reached. With trigger switch 5 closed to energize an input lead 41 of switching circuit 39, that circuit then energizes, via an output lead 97, a magnet 38 to attract a pawl 36 and disengage it from a tooth 35 of shutter 32 by which that shutter was previously held in a position unblocking the image gate 34 for prolonged illumination of a frame. Simultaneous energization of motor 33 by way of another output lead 95 then drives the shutter 32 through a full revolution with concurrent advance of the film by traction claw 105 (FIG. 4) to align the next frame with image gate 34. Pulse P also discharges the capacitor 30 by the brief closure of a nonillustrated electronic switch inside threshold device 27. The energization of motor 33 and magnet 38 is maintained by a brush 93, coacting with a conductor strip 101' on a contact disk 70, for almost a full turn whereupon the pawl 36, loaded by a tension spring 37, rearrests the shutter in its illustrated position at the beginning of another exposure period whose duration is again measured by the ancillary photosensor 25, 9', 16' and the setting of threshold circuit 27. Another brush 98 coacting with strip 101' forms part of a homing circuit.

Disk 70 is driven by motor 33 in synchronism with shutter 32 and may, in fact, be constituted by the rear face of that shutter.

Closure of trigger switch 5 also energizes a resetting input R of a flip-flop 42 whose reset output Q is connected to an input of an AND gate 43. Another flip-flop 45 has a setting input S' connected by way of a capacitor 44 to a lead 94 extending from the junction of resistors 17 and 18 whereby input S' is driven positive upon a closure of switch 6 to set the flip-flop 45. The set output Q' of the latter flip-flop is connected on the one hand to the setting input S of flip-flop 42 and on the other hand to the second input of AND gate 43, as well as to an input of a further AND gate 56 whose other input is tied to the set output Q of flip-flop 42. A third AND gate 61 has one input connected to the same output Q and another input connected to lead 41. AND gate 43 has an output lead 48 which extends to an input of an AND gate 49 having another input tied to lead 31. An isolating diode 62 is inserted between lead 48 and an output lead 63 of AND gate 61. Flip-flop 45 also has a resetting input R' connected by way of a capacitor 65 to a lead 64 which emanates from the No. 0 output of a reversible pulse counter 50. An output lead 55 of switching circuit 39 serves for the energization of threshold circuit 27 when lines 101 and 96 are interconnected by switch 24.

Counter 50 has a forward-stepping input f and a reverse-stepping input r connected to respective AND gates 63f and 63r each having an input which, upon the unblocking of gate 49 by voltage on lead 48, receives the pulses P from threshold circuit 27 by way of an OR gate 46. Lead 63 extends to a second input of AND gate 63r and to an inverting second input of AND gate 63f. Another input of OR gate 46 is tied to an output lead 58 of an ancillary pulse generator 57 having a starting input connected to the output AND gate 56 and having a stopping input connected to a lead 53 which emanates from the No. 36 output of the 36-pulse counter 50. The several stage outputs of pulse counter 36 are connected to an impedance network 51, including a number of resistors in series with respective diodes, which converts the reading of that counter into a voltage on an output lead 52 rising progressively as the count increases from zero through 36. Lead 52 is connected to the noninverting input of operational amplifier 16'. A further AND gate 47 has inputs connected to a branch 59 of lead 53 as well as to lead 48, its output lead 54 extending to switching circuit 39.

Shutter 32 has another tooth 35', offset by about 45° from tooth 35, which is engageable by pawl 36 upon a reopening of trigger switch 5 to stop the shutter in a home position obstructing the image gate 34.

Details of switching circuit 39 have been illustrated in FIG. 5 which shows the lead 41 connected via an armature and a back contact of a relay 69 to output leads 95 and 97 serving for the energization of drive motor 33 and magnet 38, that connection also including an armature and a front contact of a relay 67 when the relay 69 is operated by voltage on lead 96, i.e. when the system is switched to the long-term mode. The same front contact of relay 69 is connected to lead 55 via an armature and a back contact of a further relay 68. Brushes 98 and 93 are respectively connected to lead 97 via another armature of relay 69 in the operated and the nonoperated state of that relay. Brush 98 is offset from brush 93 by the same angle of about 45° which separates teeth 35 and 35' on shutter 32; thus, brush 93 is aligned with a gap of conductor strip 101' in the illustrated unblocking position in which tooth 35 is engaged by pawl 36 whereas brush 98 registers with that gap in a home position in which pawl 36 coacts with tooth 35' while the shutter obstructs the image gate 34. The windings of relays 67, 68 and 69 are inserted between ground and leads 31, 54 and 96, respectively.

With main switch 99 closed and with selector switch 20 engaging bank contact 23a or 23b in a position corresponding to normal operation, closure of trigger switch 5 applies voltage to lead 41 so that motor 33 is energized while magnet 38 retracts the pawl 36 to facilitate the rotation of shutter 32 at a constant speed, e.g. of 18 revolutions per second. When switch 5 is reopened while the shutter is out of its normal blocking position, brush 98 contacts the strip 101' and maintains the energization of motor 33 and magnet 38 until the shutter has homed.

If the user moves the switch 20 from its bank contact 23a (or 23b) to contact 23c, the resulting energization of lead 96 by way of switch 24 actuates the relay 69 which thereupon reverses its armatures. If brush 93 is disaligned from the gap of strip 101 at this instant, motor 33 and magnet 38 operate until shutter 32 reaches the unblocking position shown in FIG. 2, thereby starting a period of long-term exposure. When threshold circuit 27 is triggered by a sufficient charge on capacitor 30, it emits a stepping pulse P on lead 31 for a brief actuation of relay 67 which re-energizes the motor 33 and the magnet 38. The coaction of brush 93 with homing strip 101' then allows the shutter to make one full turn before being again arrested in its unblocking position by the pawl 36. Relay 69 can be released by a return of switch 20 to one of its other two positions or by the opening of master switch 99; otherwise that relay remains operated even when the trigger switch 5 is opened.

Let us assume, now, that the user wishes to terminate a sequence of long-term exposures with a fade-out effect. This is brought about simply by a closure of switch 6 which not only short-circuits the resistor 17 in the photometric circuit associated with objective 3 but also sends a positive pulse along lead 94 by way of capacitor 44 to the setting input S' of flip-flop 45. With flip-flop 42 held reset by the continuing closure of switch 5, the AND gate 43 conducts and energizes the lead 48 which opens the gate 49 to the passage of the next stepping pulse P. This pulse now traverses the OR gate 46, as well as the AND gate 63f in view of the absence of voltage on the lead 63 connected to the inverting input of that AND gate, and energizes the forward-stepping input f of counter 50. This counter now takes one step for each arriving pulse P until its count reaches the maximum value of 36, corresponding to as many frames.

As the counter advances, network 51 generates a progressively increasing voltage on lead 52 and therefore on the noninverting input of amplifier 16' whose output current rises by similar increments, it being assumed that the illumination of photodiode 25 through diaphragm 26 remains substantially constant. This results in a progressive foreshortening of successive shutter cycles and, therefore, in a diminishing exposure of consecutive frames. When counter 50 reaches its maximum count, that exposure is so short that the scene is practically dark when the developed film is subsequently run through a projector. With 36 frames included in a fade-out operation, its reproduction will last about two seconds.

At this point, the lead 53 carries voltage and, via its branch 59, applies it to one input of AND gate 47 whose other input already receives voltage from lead 48. AND gate 47, therefore, conducts and energizes the lead 54 to actuate the relay 68 within switching circuit 39 (see FIG. 5), thereby breaking the connection between leads 41 and 55. This operation deactivates the threshold circuit 27 so that no further stepping pulses can be generated even if switch 5 is still held depressed. The user may be apprised of the state of counter 50 by signal lamps, e.g. in the form of light-emitting diodes, energized upon conduction of the No. 0 and No. 36 counter outputs and positioned in the viewfinder or on the outer surface of the camera housing.

In order to start a series of long-term exposures with a fade-in effect, the shutter 6 must be closed before the trigger 5 is pressed whereby flip-flip 45 is set as before and, via its output Q', also sets the flip-flop 42 since no counteracting voltage is present at this time on the lead 41 connected to resetting input R. The concurrent setting of the two flip-flops makes AND gate 56 conductive and causes the start of the pulse generator 57, this generator emitting on lead 58 a series of ancillary stepping pulses P' which traverse the OR gate 46 and the AND gate 63f to advance the counter 50 into its No. 36 position. Voltage on lead 53 then stops the pulse generator 57 but does not reach the lead 54 inasmuch as AND gate 43 does not conduct at this time. Closure of switch 5 then renders the AND gate 61 conductive, with resulting energization of lead 63 whose voltage is transmitted by diode 62 to lead 48 for unblocking the gate 49.

Generator 57 may have an operating frequency substantially higher than the 18-Hz frame cadence so that counter 50 is stepped to its maximum count in considerably less than two seconds.

Since the No. 36 output of counter 50 is energized at this stage, the output voltage of network 51 on lead 52 is high so that threshold circuit 27 emits its first pulse almost immediately upon the energization of lead 55 by the closure of switch 5; with flip-flip 45 still set, voltage on setting input S of flip-flop 42 prevents the resetting of the latter flip-flop. The voltage on lead 63 blocks the AND gate 93f and unblocks the AND gate 63r so that the pulse emitted by threshold circuit 27 are now passed to the reverse-stepping input r of counter 50 which is thereby gradually returned to zero. The progressive decrease in the voltage of lead 52 throttles the output current of amplifier 16' and correspondingly lengthens the exposure periods until they reach the maximum value consistent with the incident illumination.

When the counter 50 energizes its No. 0 output after 36 stepping pulses, voltage on lead 64 creates a positive pulse transmitted by capacitor 65 to the resetting input R' of flip-flop 45. Flip-flop 42 is now reset by the voltage on lead 41 and AND gates 43, 47, 56 and 61 are all cut off. The system now operates in a long-term mode as initially described.

With the exposure-control system of FIG. 2, the camera may also be operated in the long-term mode when there is sufficient illumination for normal filming but when it is desired to perform time-lapse cinematography; for that purpose it is merely necessary to reduce the apertures of diaphragms 8 and 26 to an extent consistent with the selected exposure period. Fade-in and fade-out can then be carried out in the aforedescribed manner.

Figure 3:
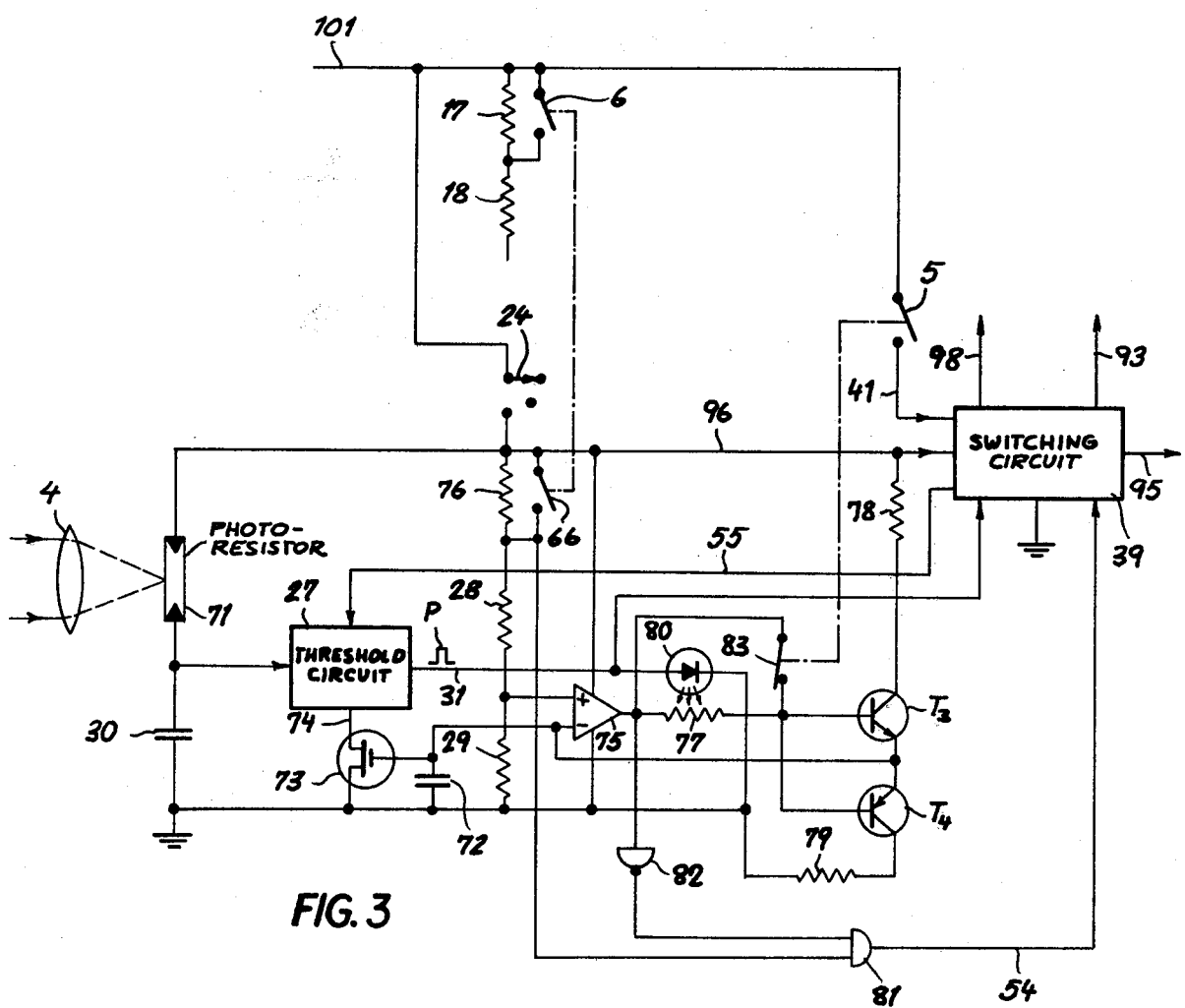
FIGS. 3 and 4 are circuit diagrams showing partial modifications of the control system of FIG. 2.

In FIG. 3 I have shown a modified control system according to my invention whose conventional components, associated with main objective 3, are the same as those shown at the top of FIG. 2 and have not been illustrated except for the resistors 17, 18 and the selector switch 6. That switch is here ganged with another normally open switch 66 shunting a resistor 76 which lies in series with voltage divider 28, 29 between ground and ancillary bus 96. Storage capacitor 30 is here charged directly from line 96 via a photoresistor 71 illuminated by objective 4 without the interposition of an ancillary diaphragm. Threshold circuit 27 is provided in this embodiment with a biasing unit 74 connected to the drain electrode of a field-effect transistor 73, preferably of the MOSFET type, whose source electrode is grounded and whose gate electrode is connected to ground through a biasing capacitor 72. This gate electrode is also tied to the inverting input of an operational amplifier 75 whose noninverting input is connected to the junction of resistors 28 and 29.

Capacitor 72 and amplifier 75 form part of a signal generator comprising two complementary transistors $T_3$, $T_4$ which are inserted between ground and line 96 in series with respective collector resistors 78 and 79. The bases of transistors $T_3$, $T_4$ are jointly connected to the output of amplifier 75 by way of a photoresistor 77 forming part of a photoelectric coupler which also includes a light-emitting diode 80 closely juxtaposed therewith, this diode being inserted between ground and the output lead 31 of threshold circuit 27. Photoresistor 77 is shunted by a switch 83 which is ganged with trigger switch 5 and is closed when the latter is open.

The input lead 54 of switching circuit 39, whose energization terminates the operation of threshold circuit 27, is here shown to extend from the output of an AND gate 81 with one input connected to the output of amplifier 75 by way of an inverter 82 and with another input tied to the junction of resistors 28 and 76.

When the user selects the long-term mode by operating the switch 20 (FIG. 2), switch 24 again energizes the line 96 from bus 101 so that threshold circuit 27 is enabled by switching circuit 39 and operates as in the preceding embodiment with emission of a series of stepping pulses P, the pulse rate being here determined by the time constant of photoresistor 71 and capacitor 30 as well as by the threshold level generated within circuit 27 by a voltage divider which includes the drain/source path of MOSFET 73. The effective resistance of this path is determined by the charge of the biasing capacitor 72 which in the open state of switch 66 depends on the relative magnitudes of resistors 28, 29 and 76. Prior to closure of switch 5, the shunt path established by switch 83 has stabilized the emitter potential of transistors $T_3$, $T_4$ at a value corresponding to that of the reference voltage applied to the noninverting input of amplifier 75. This emitter potential does not change significantly when, upon closure of switch 5 and opening of switch 83, photodiode 80 is intermittently energized by pulses P to render the photoresistor 77 conductive.

If the user now closes the switches 6 and 66 to initiate a fade-out operation, this noninverting input is driven sharply positive with reference to the emitters of transistors $T_3$, $T_4$. This turns on the transistor $T_3$ for a very brief period in the presence of a pulse P whereby capacitor 72 receives a small incremental charge and correspondingly lowers the threshold of circuit 27. The same procedure is repeated during successive shutter cycles, with progressive diminution of exposure to substantially zero over a sequence of preferably 36 frames.

When the inverting and noninverting inputs of amplifier 75 are again at the same potential, this amplifier ceases to have an output voltage and inverter 82 unblocks the AND gate 81 whose other input receives voltage from line 96 via switch 66. Circuit 39 operates as in the preceding embodiment to cut off the supply to threshold circuit 27 and, possibly, to light an indicator lamp advising the user of this fact.

To initiate a fade-in operation, the user must again close switch 6 before depressing the trigger 5. With switches 66 and 83 closed, the emitter potential of transistors $T_3$, $T_4$ is stabilized at a more positive value than in the previous instance (prior to the initiation of fade-out) so that the threshold of circuit 27 is low and, upon closure of trigger switch 5, a pulse P is promptly emitted after a very short exposure period. When the user now reopens the switches 6 and 66, the noninverting input of amplifier 75 is driven sharply negative whereupon transistor $T_4$ conducts in the presence of each pulse P for a progressive discharge of biasing capacitor 72 and a corresponding rise in the threshold level. The lengthening shutter cycle gradually increases the exposure period to the extent determined by the incident light as measured by photoresistor 71. Threshold circuit 27 is again deactivated by switching circuit 39 as soon as the input voltages of amplifier 75 are identical.

In FIG. 4 I have shown a signal generator 150, which could be similar to pulse counter 50 and impedance network 51 of FIG. 2, driven from threshold circuit 27 via gates 49 and 46 as described above. The output lead 52 of this signal generator is here connected to ground by way of a resistor 111 and is tied to a bank contact of a manual switch 120 interconnecting the operational amplifiers 9 and 16 for normal operation, as in the embodiment of FIG. 2. Another switch 124, ganged with switch 120, connects the output of amplifier 9 upon a reversal of these switches to capacitor 30 by way of an electronic switch 84 controlled by the set output Q' of flip-flop 45; when that flip-flop is set by the energization of its input S' upon closure of switch 6, switch 84 is reversed to connect the capacitor 30 to bus 101 by way of a photoresistor 71 of the type shown in FIG. 3, illuminated through ancillary objective 4.

A changeover to long-term exposure by a displacement of switches 120 and 124 activates the threshold circuit 27 which at this stage is controlled by the photometric circuit 7, 9 without intervention of photosensor 71. When switch 6 is closed for a fade-out effect, AND gate 49 is unblocked as in FIG. 2 to step the signal generator 150 in a forward sense by the pulses from threshold circuit 27. At the end of the fade-out operation, generator 150 again energizes its output lead 53 to deactivate the threshold circuit 27 by means of the switching circuit 39 (not shown in FIG. 4) and to indicate this fact to the user by the lighting of a signal lamp if desired.

In a manner analogous to that described with reference to FIG. 2, signal generator 150 may be preset by closure of switch 6 prior to depression of the trigger 5 (also not shown in FIG. 4) and may thereafter be stepped back to zero, with resulting energization of output lead 64.

In the system of FIG. 4 the progressive foreshortening of the exposure periods during fade-out and their lengthening during fade-in is achieved by the stepped voltage appearing on lead 52, that voltage being transmitted by switch 120 to the noninverting input of amplifier 16 causing the conduction of transistor $T_1$ or $T_2$ to close or open the diaphragm 8 in a series of increments over an interval again encompassing approximately 36 frames. As long as the external illumination does not change significantly, threshold circuit 27 operates with a substantially constant pulse cycle.

Figure 6:
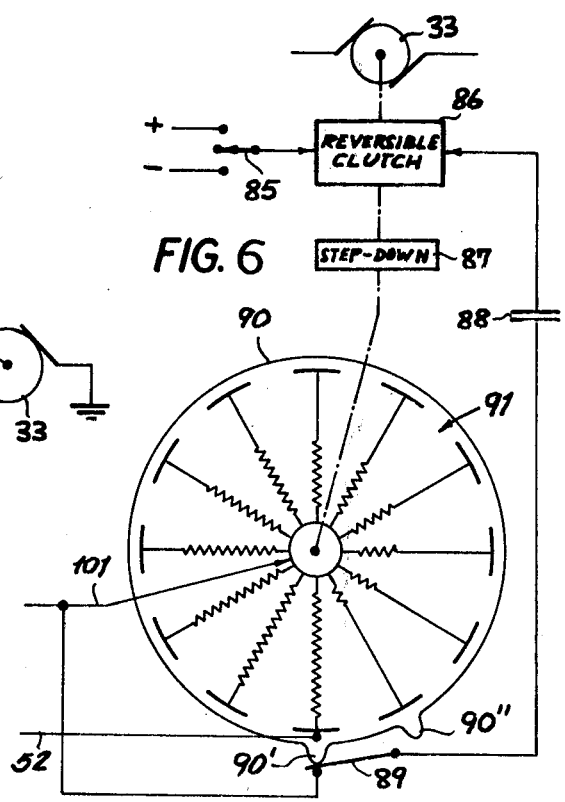
FIG. 6 illustrates a mechanical signal generator for such a system.

In FIG. 6 I have illustrated a mechanical signal generator comprising a program disk 90 which can be entrained by motor 33 through the intermediary of a reversible clutch 86 and a step-down transmission 87. Clutch 86 may be activated by a manual switch 85 for operation in one or the other direction; after the disk 90 has performed a nearly complete revolution, a pair of contacts 89 are closed by one of two neighboring cams 90', 90'' to send a stop pulse through a capacitor 88 to clutch 86 for decoupling the disk from motor 33. An impedance network 91 on disk 90 comprises a multiplicity of resistors which are successively inserted between positive bus 101 and output lead 52 when the disk rotates; with counterclockwise rotation from the illustrated position, these resistors progressively decrease in magnitude so that the output voltage on lead 52 increases in a succession of steps for a fade-out operation. For fade-in, the disk may be first preset by a counterclockwise rotation until contacts 89 are closed by the cam 90''. The clutch 86 is then actuated in reverse for a clockwise rotation establishing a fade-in sequence which terminates when contacts are again closed by cam 90'.

I claim:

1. In a motion-picture camera provided with a picture-taking objective for illuminating successive frames of a film moving past an image gate in line with said objective, a shutter movable into and out of a blocking position obstructing said image gate, drive means for intermittently transporting the film past said image gate while moving said shutter into its blocking position during advances of the film from one frame to the next, timing means operable to arrest said drive means in an unblocking position of said shutter for a variable exposure period forming part of a shutter cycle, and photometric means operable to control said timing means for varying the duration of said exposure period generally inversely with the intensity of illumination traversing said image gate, said timing means including a storage capacitor and a threshold circuit connected across said storage capacitor for integrating an electrical output variable of said photometric means to emit a pulse terminating said exposure period upon attainment of a capacitor charge corresponding to a reference level established by said threshold circuit, the combination therewith of fading-control means adapted to be operatively coupled with said timing means for changing the exposure of successive frames between a predetermined maximum value and a predetermined minimum value, said fading-control means comprising a signal generator connectable to said threshold circuit for progressively modifying said reference level to alter said exposure period by discrete increments during successive shutter cycles.

2. In a motion-picture camera provided with a picture-taking objective for illuminating successive frames of a film moving past an image gate in line with said objective, a shutter movable into and out of a blocking position obstructing said image gate, electrical drive means for intermittently transporting the film past said image gate while moving said shutter into its blocking position during advances of the film from one frame to the next, photometric means measuring ambient illumination, switchover means having a first position for the establishment of a normal operating circuit for said drive means with continuous movement of said shutter and having a second position for the establishment of a long-term operating circuit for said drive means, said long-term operating circuit including timing means controlled by said photometric means for the emission of a series of pulses at a cadence varying with the intensity of illumination traversing said image gate, said drive means being responsive to said pulses in said second position of said switchover means for arresting said shutter in an unblocking position for an exposure period which forms part of a shutter cycle and varies in duration generally inversely with said intensity of illumination, and trigger means for operating said drive means, the combination therewith of fading-control means selectively activable in said second position of said switchover means for changing the exposure of successive frames between a predetermined maximum value and a predetermined minimum value, said fading-control means comprising a signal generator actuatable in response to the emission of said pulses by said timing means to produce a stepped control signal for progressively modifying an exposure-determining parameter by discrete increments during a predetermined number of successive shutter cycles.

3. The combination defined in claim 2 wherein said timing means comprises a storage capacitor connected to said photometric means and a threshold circuit connected across said storage capacitor.

4. The combination defined in claim 3 wherein said signal generator is provided with input means connectable to said threshold circuit for stepping by said pulses.

5. The combination defined in claim 2, 3 or 4, further comprising a diaphragm in line with said objective provided with aperture-adjusting means connected to an output of said signal generator for progressively changing the effective width of said diaphragm independently of ambient illumination in response to said stepped control signal.

6. The combination defined in claim 4 wherein said signal generator comprises a reversible pulse counter, further comprising an ancillary pulse source connectable to said input means for forward stepping of said signal generator preparatorily to a fade-in operation involving reverse stepping by said threshold circuit, and switchover means enabling forward stepping of said signal generator by said threshold circuit during a fade-out operation.

7. The combination defined in claim 6 wherein said switchover means comprises a flip-flop.

8. The combination defined in claim 1 or 4 wherein said signal generator comprises a biasing capacitor connected to a reference input of said threshold circuit and provided with a charging path and a discharging path, first switch means in said charging path, second switch means in said discharging path, and pulse-responsive means connected to said threshold circuit for briefly closing a selected one of said switch means during each of said successive shutter cycles.

9. The combination defined in claim 8 wherein said pulse-responsive means includes a photoelectric coupling.

10. The combination defined in claim 8 wherein said reference input include a field-effect transistor having a gate/source path shunted by said biasing capacitor.

11. In a motion-picture camera provided with a picture-taking objective for illuminating successive frames of a film moving past an image gate in line with said objective, a shutter movable into and out of a blocking position obstructing said image gate, drive means for intermittently transporting the film past said image gate while moving said shutter into its blocking position during advances of the film from one frame to the next, timing means operable to arrest said drive means in an unblocking position of said shutter for a variable exposure period forming part of a shutter cycle, and photometric means operable to control said timing means for varying the duration of said exposure period generally inversely with the intensity of illumination traversing said image gate, said timing means including a storage capacitor and a threshold circuit connected across said storage capacitor for integrating an electrical output variable of said photometric means to terminate said exposure period upon attainment of a capacitor charge corresponding to a reference level established by said threshold circuit,
the combination therewith of fading-control means adapted to be operatively coupled with said timing means for changing the exposure of successive frames between a predetermined maximum value and a predetermined minimum value, said fading-control means comprising a signal generator connected to said storage capacitor for progressively modifying the charge thereof independently of said photometric means by discrete increments during successive shutter cycles.

12. The combination defined in claim 11, 3, 4 or 6 wherein said photometric means includes a voltage comparator with inputs respectively connected to a photosensor and to a source of reference voltage, said signal generator having an output connected to an input of said voltage comparator.

13. The combination defined in claim 2 or 3 wherein said signal generator comprises a program disk connectable with said drive means for entrainment thereby.

14. The combination defined in claim 2, 3 or 4, further comprising a diaphragm in line with said objective provided with aperture-adjusting means coupled with said photometric means in said first position of said switchover means during normal operation with a constant shutter cycle, said fading-control means further including selection means independent of said switchover means for modifying the coupling between said photometric means and said aperture-adjusting means to simulate a more intense illumination with resulting reduction of the diaphragm aperture to provide a fade-out effect, said switchover means decoupling said diaphragm-adjusting means from said photometric means in said second position while making said signal generator switchable by said selection means to emit a control signal monotonically varying in a sense depending upon the sequence of operation of said selection means and said trigger means.

* * * * *